United States Patent [19]

Davis et al.

[11] Patent Number: 5,432,948
[45] Date of Patent: Jul. 11, 1995

[54] OBJECT-ORIENTED RULE-BASED TEXT INPUT TRANSLITERATION SYSTEM

[75] Inventors: Mark E. Davis, Cupertino; Judy Lin, San Jose, both of Calif.

[73] Assignee: Taligent, Inc., Cupertino, Calif.

[21] Appl. No.: 53,790

[22] Filed: Apr. 26, 1993

[51] Int. Cl.⁶ .................................. G06F 7/00
[52] U.S. Cl. ............................ 395/800; 395/138; 395/144; 395/159; 364/419.02
[58] Field of Search ............... 395/800, 700, 575, 159, 395/157, 155, 151, 150, 144, 138, 100; 364/419.02, 419.07, 419.08, 419.09, 419.14, 419.10; 382/9–12, 30

[56] References Cited

U.S. PATENT DOCUMENTS

| | | | |
|---|---|---|---|
| 4,493,080 | 8/1984 | Dysart et al. | 364/200 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,951,202 | 8/1990 | Yan | 364/419 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,091,950 | 2/1992 | Ahmed | 381/51 |
| 5,093,914 | 3/1992 | Coplien et al. | 395/700 |
| 5,113,342 | 5/1992 | Zamora | 364/419 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,224,039 | 6/1993 | Cox et al. | 364/419 |
| 5,224,040 | 6/1993 | Tou | 364/419 |
| 5,276,616 | 1/1994 | Kuga et al. | 364/419.08 |
| 5,329,446 | 7/1994 | Kugimiya et al. | 364/419.04 |

FOREIGN PATENT DOCUMENTS

2125197  2/1984  United Kingdom.

OTHER PUBLICATIONS

Journal of the Institution of Electronics and Telecommunication Engineers, India, V. 30(6), Nov. 1984, pp. 243–245, Sinra, R. M. K. "Machine Transliteration from Roman to Devangari and Devangari to Roman".

Database WPI, Week 9233, Derwent Publications, Ltd., London, Anonymous, "Method for Implementing Action-Object Direct Manipulation".

Journal of Information Processing, Japan, V.8(4), 1985, pp. 300–306 Hoshino, "Implementation of an Intelligent Thai Computer Terminal".

Proceedings of the First International Conference on Text Processing Systems 26, Oct. 1984, Dublin, Ireland, pp. 133–144, Griffith, "Typesetting Exotic Languages at Oxford University".

Database WPI, Week 9012, Derwent Publications, Ltd., London, Anonymous "Automatic Program Processing for Windowing System" & Research Disclosure.

*Primary Examiner*—Alyssa H. Bowler
*Assistant Examiner*—Alpesh M. Shah
*Attorney, Agent, or Firm*—Keith Stephens

[57] ABSTRACT

A computer implemented system and method utilizing rules instantiated in objects of an object-oriented operating system to transliterate text as it is input into a computer is disclosed. A number of transliterator objects are created in the storage of the computer, each one of the transliterator objects include transliteration rules arranged in the storage in a preferred order. Each of the transliteration rules contain a first language character string, a second language character string, and logic for comparing the first language character string in each of the transliteration rules to a text string that is entered into a computer to determine a subset of transliteration rules which match the entered text string. The entered text is displayed on a computer display as it is input into a computer and a particular one of the plurality of transliterator objects' logic is utilized in response to the preferred order for selecting one of the subset of transliteration rules and applying it to the first text string to display the second language character string of the selected transliteration rule on the display.

24 Claims, 7 Drawing Sheets

Transliteration Rules

| Previous context | Source | Following context | Result | Rechecked result |
|---|---|---|---|---|
| | k | | क | ` |
| | aa | | T | |
| | a | | | |
| | aa | | आ | |

Wildcards

| symbol | | contents |
|---|---|---|
| ③ | ✔ | aeiou |
| ④ | ⊘ | aeiou |
| ⑤ | ✔ | abcdefghijklmnopqrstuvwxyz |

Test

Source: k, ka, kaa, aa

Result: क्, क, का, आ

OBJECT-ORIENTED RULE-BASED TEXT INPUT TRANSLITERATION SYSTEM

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application Ser. No. 071,996,171 entitled Text Transliteration System, by Mark Davis and Judy Lin, filed concurrently with this application, and assigned to Taligent, the disclosure of which is hereby incorporated by reference.

1. Field of the Invention

This invention generally relates to improvements in computer systems and more particularly to intelligently transliterating text as it is input to a computer system.

2. Background of the Invention

U.S. Pat. No. 5, 148,541 discloses a multilingual database system including sorting data using a master universal sort order for all languages. The database system can be searched and retrieved by a user whether or not that data is in the user's own language. The data to be stored in the database is first encoded according to a master (or universal) sort order.

U.S. Pat. No. 4,734,036 discloses a method and device for learning a language. The patent discusses a teaching aid for reinforcing a student's ability to learn an unfamiliar language including an upper sheet (12) marked with symbolic indicia to be taught to the student and one or more base sheets (11), each marked with a different translated version of the indicia on the upper sheet. The indicia on each base sheet are marked in registry with the corresponding indicia on the upper sheet. One edge of the base sheet is joined, temporarily or permanently, to a corresponding edge of the upper sheet to allow the upper sheet to be lifted up from the base sheet to briefly expose a corresponding translation, transliteration, interpretation, or paraphrase marked on the base sheet then lowered again so that reading of the upper sheet can be instantly resumed.

U.S. Pat. No. 4,547,765 discloses a method and circuit arrangement for transliteration of code words of a code having m-place code words into corresponding code words of a different code likewise having m-place code words, individual bits of the code word to be transliterated are forwarded during serial input into a m-place shift register or during the serial output therefrom. These bits are forwarded non-negated or negated from register stage to register stage over a respective forwarding circuit depending upon the measure or criterion of coincidence or noncoincidence between the code word to be transliterated and the code words of the different code. This occurs in such manner that the traversing bits experience a respective negation in front of and after a register stage whose position within the shift register corresponds to the position of non-coinciding bits within the two code words.

Systems such as the Apple® Macintosh® or Microsoft® Windows (TM) have dead keys which are employed to extend the range of the keyboard for accented characters. With this mechanism, a user can type a key (e.g. option-u for umlaut) which puts the keyboard into a special state, but does not generate a character or any other visible indication of what has occurred. When the user then types a base character—one that combines with the accent—then the keyboard generates the resulting accented character, for example, typing option-u, e produces ë). However, this approach requires a user to be cognizant of particular special keys associated with a particular task.

SUMMARY OF THE INVENTION

Accordingly, it is a primary objective of the present invention to provide a set of flexibly defined rules stored in data structures in a computer system to automatically apply user specified transliterations to text as it is input to a computer system.

DETAILED DESCRIPTION OF THE INVENTION

Figure 1:
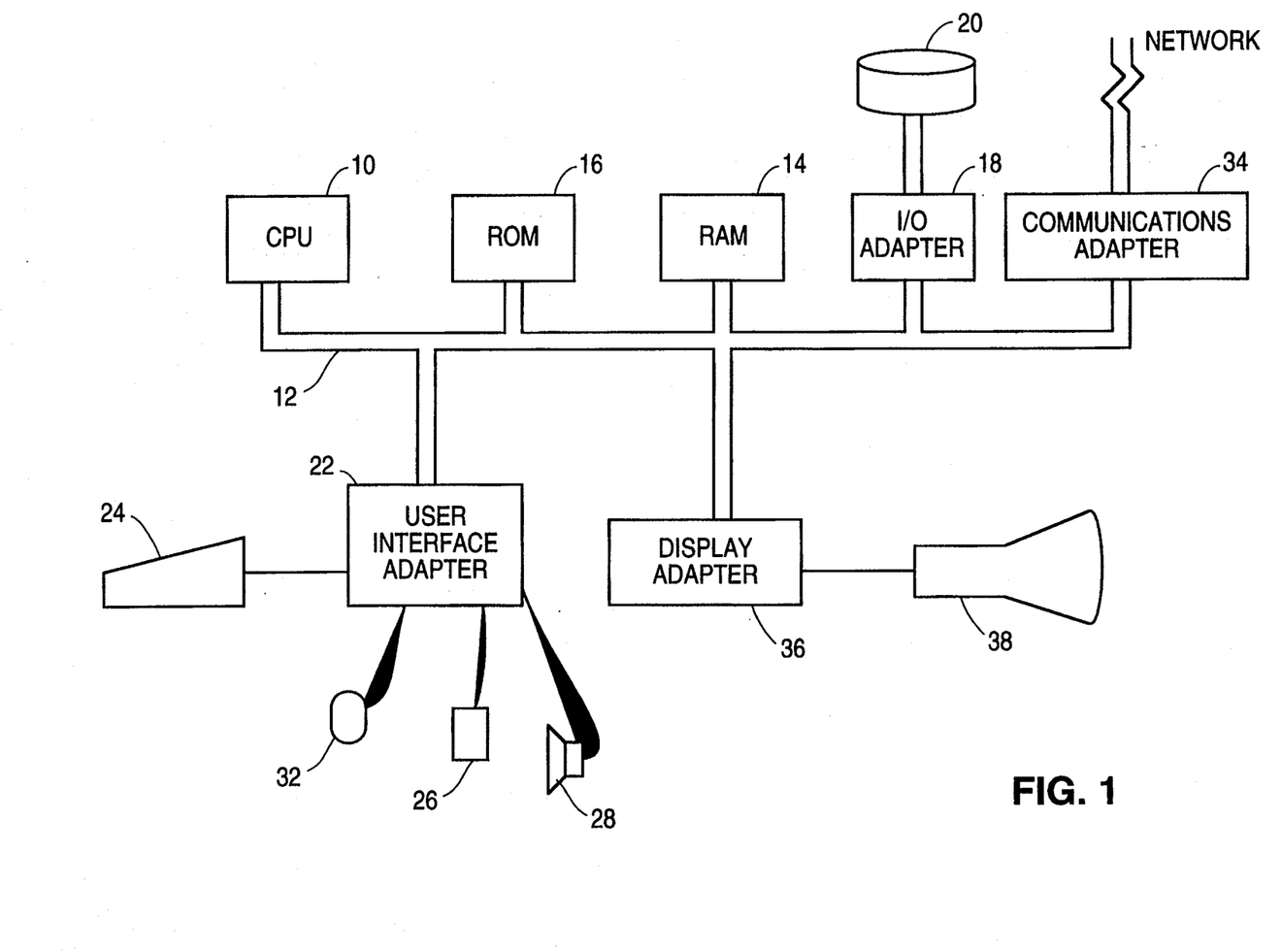
FIG. 1 (is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

KEYBOARD TRANSLITERATORS

On the Apple Macintosh computer, dead keys are used to extend the range of the keyboard for accented characters. With this mechanism, a user can type a key (e.g. option-u for umlaut) which puts the keyboard into a special state, but does not generate a character or any other visible indication of what has occurred. When the user then types a base character—one that combines with the accent—then the keyboard generates the resulting accented character (e.g. option-u, e produces ë).

| Dead-Key Example | | |
|---|---|---|
| Key | Deadkey state | Display |
| b | <none> | b |
| option-u | <umlaut> | b |
| a | <none> | bä |
| d | <none> | bäd |

In a preferred embodiment of this invention, the modal mechanism is replaced by the use of transliterators. When an application inserts characters from a keyboard into some text, then it will call the list of transliterators associated with that keyboard, and the input method for the keyboard. An accent transliterator can provide the same functionality as dead keys. When an accent is typed, it will be combined with the previous "base" character if possible. For example:

| Key | Pre-transliterate | Display |
|---|---|---|
| b | b | b |
| a | ba | ba |
| option-u | ba¨ | bä |
| d | bäd | bäd |

Transliterators also perform many other functions. For example, they can replace generic quotes (",') by righthand and lefthand quotes ('','',''). They can also be used to perform general script transcriptions for any cases where the transcription is simple and unambiguous, as when converting from romaji to katakana or hiragana for japanese, converting jamo (letter components) to hangul (letter syllables) for Korean, or converting Querty to Hebrew, etc. By convention, an apostrophe can be used to prevent characters from being transliterated together. For example, to form "ba¨d", one would type "ba'¨d".

INPUT TRANSLITERATION

Transliteration can also be used to phonetically convert between different languages. This feature is especially important for languages such as Japanese that use a Roman keyboard to key in text, which is then transcribed into native Japanese characters. These characters can also be converted back into Roman characters. A particular class of transliterations called input transliterations obey two requirements set forth below.
Uniqueness
Transcription from native to foreign script is unambiguous. Two different native strings cannot correspond to the same foreign string. For example, if the native script distinguishes between a retroflex and a dental T, then a transliteration cannot map them onto the same symbol "t".
Completeness
Transcription from native to foreign script, or from foreign to native is complete. Every sequence of native symbols will map onto some string of foreign symbols. Transcription from foreign to native script should be complete, but is not generally unambiguous. For example, when a Roman-to-Japanese transcription is used, "ra" and "la" map onto the same Japanese symbol.

A TTransliterator object is used to perform transliterations. Input transliterators are composed of a set of context-sensitive rules. These rules are designed to allow non-programmers to edit them reasonably for localization.
Examples of rules:

| | | |
|---|---|---|
| cho | => | ちょ |
| t[t | => | っ |
| to | => | と |

Using these rules, chotto can be transliterated into: ちょっと.

Transliteration may be dependent not only on script but also on language. It is also inherently an n×n problem: expecting to transliterate from Russian to Hindi by using a series of Cyrillic-Roman and Roman-Hindi transliterations is doomed to failure, since the transcriptions used to represent non-Roman letters will vary depending on the script being represented: in some cases th will represent the sound found in thick, while in others it is an aspirated t.

A preferred embodiment provides input transliteration from Roman to Japanese (Hiragana and Katakana), Russian, Greek, Arabic, Devanagari (Hindi), and Hebrew. There is also a "Symbols" transliterator which allows a user to enter any Unicode symbol by name i.e.., "applelogo", and transcribe it to the actual character, .

Transliterators can be chained. For example, one may wish to have a "smart-quote" transliterator be the first in chain, followed by an input transliterator. This mechanism is managed by the TTypingConfiguration object.

TEXT TRANSFORMATION THROUGH TRANSLITERATION

Transliteration can also be used for language-specific processing such as converting text from upper to lower case and back, creating title text. For example, "With the Important Words Capitalized"; title text requires use of a title-filter text service in order to eliminate articles. Otherwise, the titled text will appear as: "With The Important Words Capitalized."), and stripping diacritical marks. Note that these results are achieved by modifying the text objects directly. If the transformation is only desired for display, and should not effect the actual text objects, there is an alternative method employed using metamorphosis tables in the font.

TRANSLITERATOR DESKTOP OBJECTS

Transliterators are desktop objects. For example, a user would add a transliterator to his typing configuration by dragging it from the desktop to a typing configuration encapsulator. TTransliteratorModel encapsulates, accesses and manages the transliterator data. TTransliteratorUserInterface is responsible for the icon and thumbnail presentations as well as the user interface to edit the data. A TModelSurrogate is used as a stand-in for the model, and will typically be imbedded in the typing configuration model. Programmatic access to all available transliterators: TTransliterator::GetAvailable-Transliterators(TCollection&) that will return a collection of TModelSurrogate objects. Identifying transliterators: Transliterator objects are stored as TFiles. The Pluto attribute is used to identify a transliterator.

Transliteration Internals

Background

Rule-based transliteration is designed for relatively unsophisticated users and localizers to be able to create and modify. The rules are designed to be straightforward, and to apply especially to the case of transliteration as the user types. Although designed to meet the specific needs of transcribing text between different scripts, either during user type-in or converting a range of text in a document, transliteration uses a general-purpose design which is applicable to a wide range of tasks.

A transliteration rule consists of two main parts: a source and a result. The source can be accompanied by two strings which specify the context in which the conversion is to be made. Every rule must have a source field, but the other fields may be empty. For example:

Simple Rule

| preceding context | source | succeeding context | result |
|---|---|---|---|
|  | c | i | s |

Notice above, a c is turned into an s, but only if it is followed by an i. Variables can be used to have multiple matches for characters in the context. For example:

Rule with Variables

| preceding context | source | succeeding context | result |
|---|---|---|---|
|  | c | ③ | s |

Simple Inclusive Variable

| Variable | Meaning |
|---|---|
| ③ | eiy |

A c is turned into an s, but only if it is followed by an e, /or y. There are also exclusive variables, which match if the text character is not present in the variable's contents. An exclusive variable, with empty contents, will match any character. In normal operation, once a string has been replaced, none of the replacement characters are subsequently checked for matches. However, an additional rechecked result field can be specified that will be rechecked for matches and possibly modified. An example is presented below.

Rule with rechecked result

| preceding context | source | succeeding context | result | rechecked result |
|---|---|---|---|---|
|  | k |  | ╦ | ╗ |
|  | aa |  | T |  |

In this case, the sequence kaa will be converted into ╦T. In the Indic languages, this can be used to capture the interactions between consonants and vowels in a general way.

In the text, rules are written in the following format. The three matching fields are separated from the two resulting fields by an arrow, with the contexts and rechecked result distinguished by strike-through from the adjacent fields.

Example: x̶y̶z ⇨ a̶b̶;

Example: x̶y̶z ⇨ ab;

A Transliteration is designed to hold two sets of rules, so that it can provide transliteration in both directions, such as from Katakana to Latin, and back.

Definitions

The following definitions are used in describing the internal matching process used in a preferred embodiment. There are two different ways to apply Transliteration: one is to a range of text, and the other is on type-in. The definitions apply to both cases.

A rule $r_j$ is made of preceding context, source, succeeding context, result and rechecked result. The preceding context, source, succeeding context are referred to collectively as the source fields, and the result and rechecked result are referred to collectively as the result fields. In the following the length of each part is abbreviated by length(pc), length(s), etc.

A character $c_k$ in the text matches a character $c_r$ in the rule if and only if either

$c_r$ is not a variable and $c_k = c_r$ (this is strong, bitwise identity).

$c_r$ is an inclusive variable and $c_k$ e contents $[c_r,]$ $c_r$ is an exclusive variable and ¬ $[c_k e\ c_r]$, A rule matches the text within a range at offset i if and only if all of the following:

- the length(pc) characters before i match the preceding context,
- the length(s) characters after i match the source,
- the length(sc) characters, from i+length(s) on, match the succeeding context.

| a | b | c | d | e | f | g | h | i | j |
|---|---|---|---|---|---|---|---|---|---|
| 0 | 1 | 2 | 3 | 4 | 5 | 6 | 7 | 8 | 9 | 10 |

The text set forth above is used in the following examples.

Example: bcd⇨z matches at offset 1; and b̶cd ⇨z matches at offset 2.

A rule matches the text within a range at offset i up to offset j if and only if you could add (zero or more) characters after j that would cause the rule to match at i.

Example: b̶cde ⇨z matches at offset 2 up to offset 4. A rule spans offset i in the text if and only if there is some j<i such that the rule matches the text at j up to i.

Example: a̶b̶cdef ⇨ g̶h̶ matches at offset 2, and spans offsets 1 through 5.

Example: defx ⇨ i spans offsets 4 and 5. (The text characters def match the initial part of the rule, so the offsets between those characters are spanned, even though the x doesn't match.)

Basic Operation on Ranges

Figure 2A:
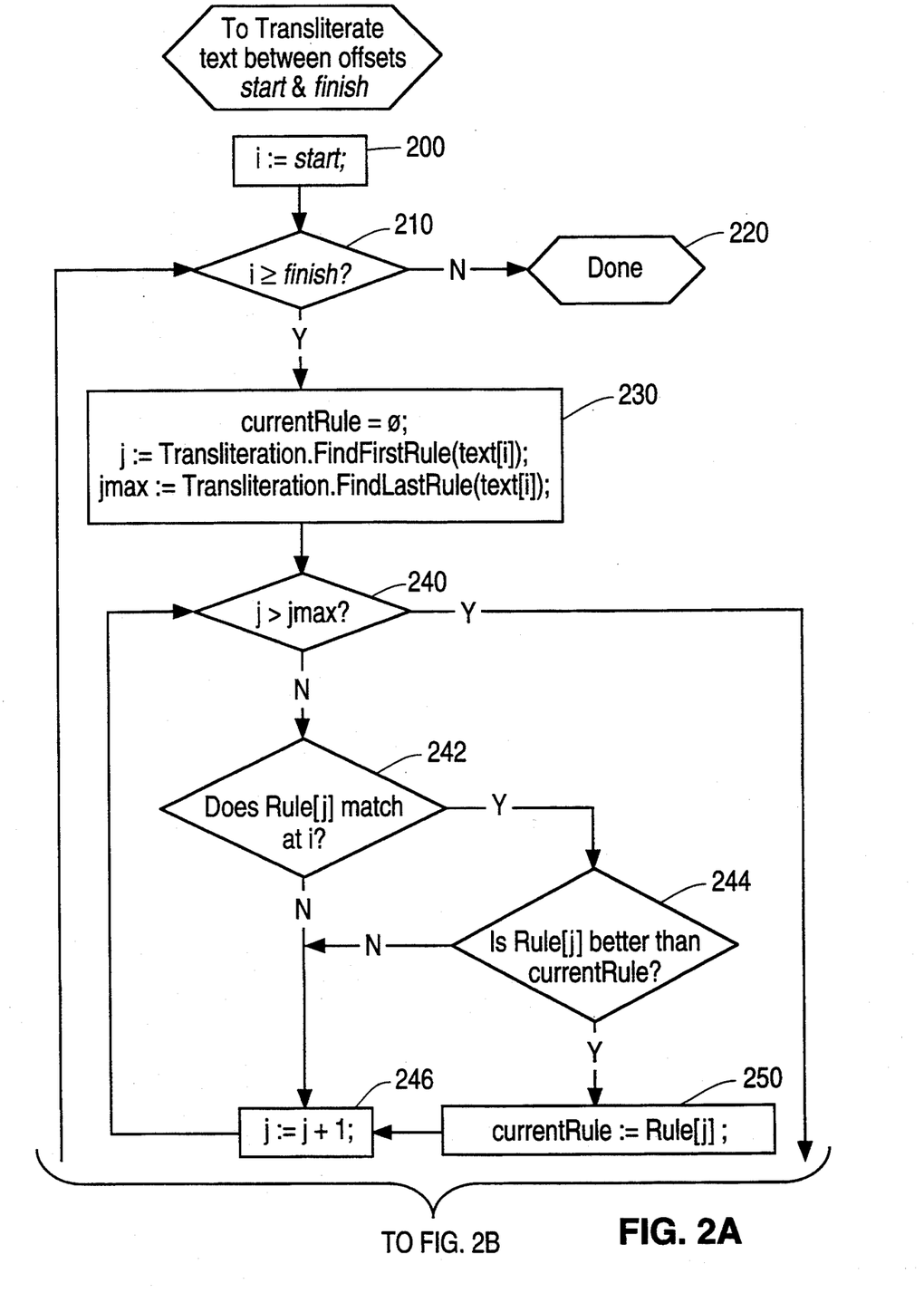
FIG. 2 is a flowchart of the logic used to transliterate text between offsets start and finish in accordance with a preferred embodiment.
Figure 2B:
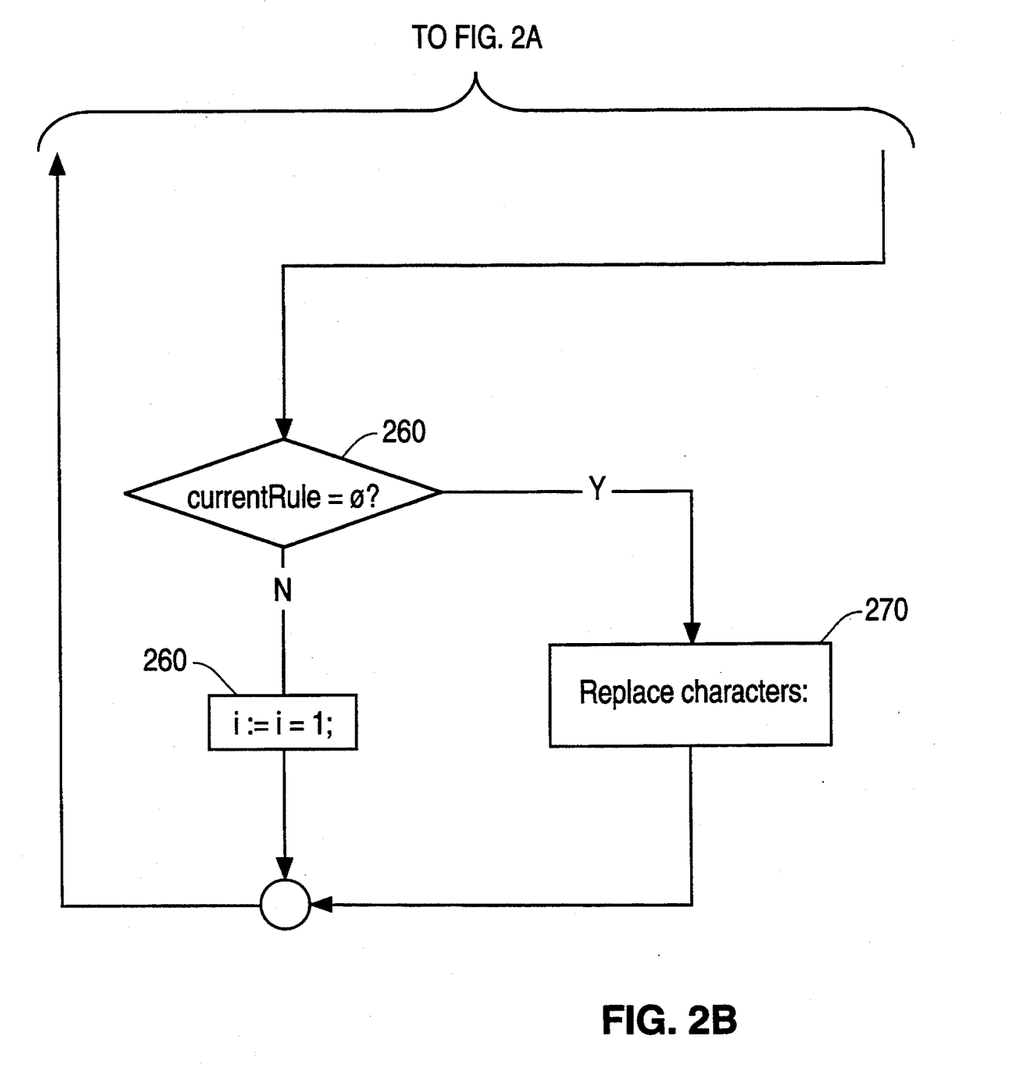

With a range of text, only the characters within the range are matched or replaced; the characters outside of the match are completely ignored. The Transliteration operation proceeds as follows. Iterate through the offsets in the range one by one. For each offset i, check through the list of rules in the transliteration for the matching rules at that offset. If there are no matching rules, then continue iterating. If there is more than one matching rule, then pick the best match as follows:

FIG. 2 is a flowchart setting forth the detailed logic of transliterating text between offsets start and finish in accordance with a preferred embodiment of the invention. Processing commences at function block 200 where index i is initialized to point to the start of the text that is to be transliterated. A test is performed at decision block 210 to determine if the index i has surpassed the finish of the text. If all the text has been processed, then processing is terminated at terminal 220. If the index i is greater than or equal to finish at decision block 210, then currentrule is zeroed, the index j is equated with the first rule found using text(i) as an index, and jmax is equated with the last rule found using text(i) as an index as shown in function block 230.

At decision block 240, a test is performed to determine if the index j has exceeded jmax. If so, then a test is performed at decision block 260 to determine if currentrule is equal to zero. If so, then at function block 270, characters are replaced as indicated and indexes are reset before passing control to decision block 240. If the index j has not exceeded jmax at decision block 240, then Rule(j) is compared to the character located at index i. If they match, then another test is performed at decision block 244 to determine if Rule(j)is better than currentRule. If so, then currentRule is equated to Rule(j) at function block 250, j is incremented at function block 246, and control is passed to decision block 240. If there is not a match at decision block 242, then j is incremented at function block 240 and control is passed to decision block 240.

In the processing described above, a match x is strictly better than a match y if and only if either:
   the preceding context of x is longer than the preceding context of y, and the source + succeeding context of x is at least as long as the source + succeeding context of y
   the preceding context of x is at least as long as the preceding context of y, and the source + succeeding context of x is longer than the source + succeeding context of y Of the matching rules, eliminate all those where there is another matching rule which is strictly better. Of the remainder, pick the first one. (Note that rules are inserted into a Transliteration in order, and that order may be significant).

Example: abc ⇨ p is better than ab ⇨ q; yab ⇨ r is also better than ab ⇨ q; however, neither abc ⇨ p nor yab ⇨ r is better than the other.

In order to speed up matching of rules, the collection of rules is indexed by indexed by the first character in the source of each rule. This does not affect the ordering of the rules, since any two rules that do not share the same first character of the source will never match at the same time, and thus never conflict. Rules with variables in the first position are resolved at the time that they are added to a Transliteration: that is, if the variable has n characters in its contents, then n different rules with the different first letters are added to the Transliteration. When processing forward (either ranges or type-in), the rules are looked up by this first character, then sequentially accessed.

Once a matching rule is identified, a replacement is performed. The source is replaced from the matching rule by the result fields (result + rechecked results). This may change the length of the text, since it may be different in length than the source. Resume iterating, starting at the offset i+ length(result). This will mean that the rechecked results may be matched and modified. (The plain result can match against the preceding context of another rule, but will not be matched against the source, and thus cannot be subsequently modified).

Operating on Type-In

When transliteration is applied to type-in, the operation is somewhat different. The goal is to produce the same results as would have occurred had the user typed in all of the text without transliteration, then converted it with the range conversion above. In addition, text is converted as it is entered.

It is difficult to predict what characters will follow after an initial text entry, so the process of transliteration cannot be completed until the user has entered additional characters. Example: suppose that there are rules ph ⇨ φ and p ⇨ π. If the user has just typed in a p, it is impossible to finalize a match because an ambiguity between the two rules exists. When the user types a new character, that character may be modified, and preceding characters may also change, since a unique rule may be specified.

The other complication is that it is impossible to predict the starting point of the range, because the user may have just changed to the current transliteration, or just clicked in a new location. So, the text is only converted that could not have been converted without additional characters. Also, if the user is inserting text, all characters after the insertion point are always ignored, so the operation always behaves as if it is at the end of the text.

Figure 3:
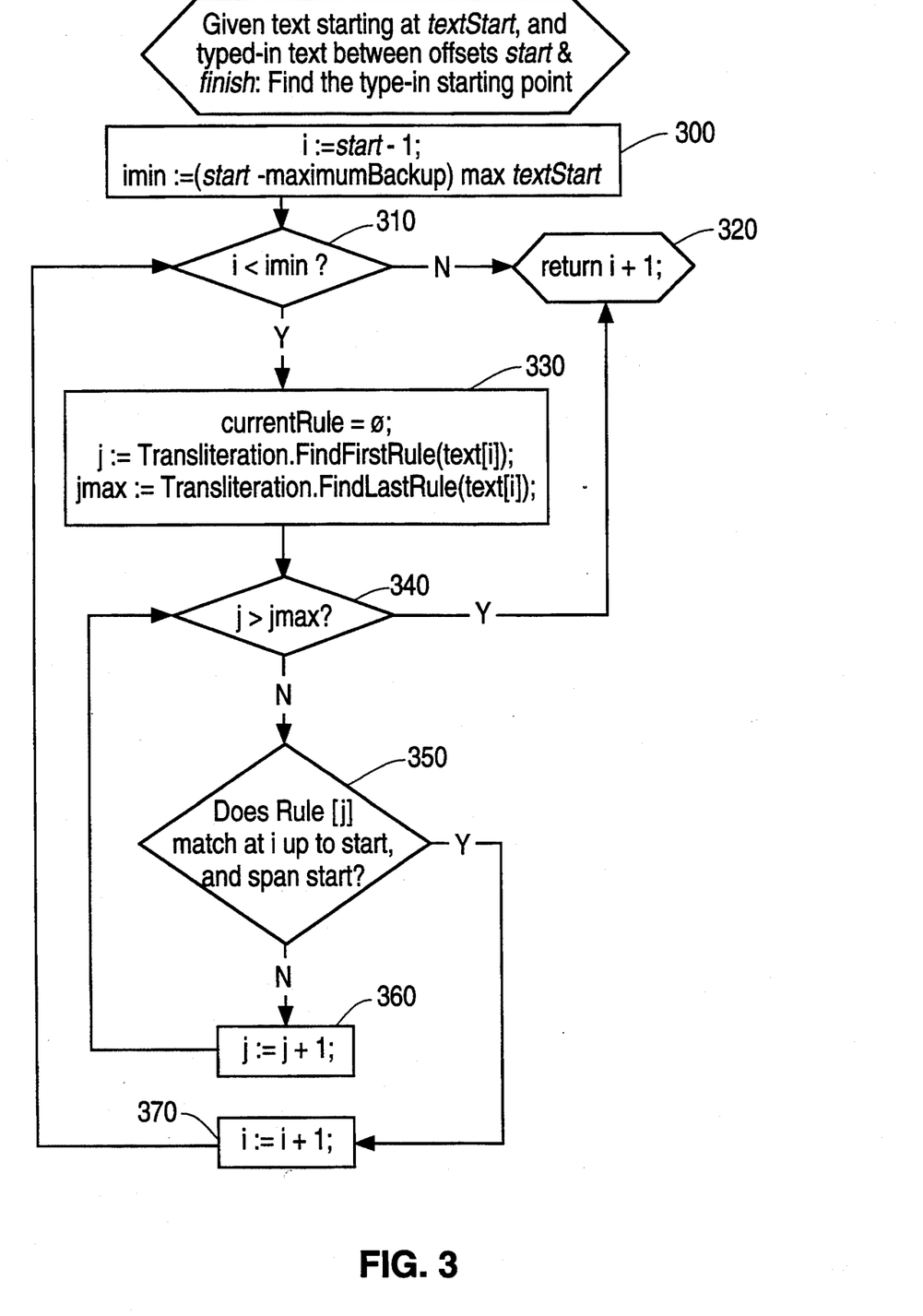
FIG. 3 is a flowchart of the logic used to identify a type-in starting point in accordance with a preferred embodiment.

FIG. 3 is a flowchart setting forth the detailed logic of transliteration processing between two portions of a text delimited by textStart and textFinished in accordance with a preferred embodiment of the invention. Processing commences at function block 300 where an index i is initialized, and imin is initialized. Then, at decision block 310, a test is performed to determine-if i<imin. If not, then i+1 is returned at terminal block 320. If i is less than imin, then at function block 330, the currentrule variable is set equal to zero, j is equated to the rule found using i as an index into text for finding the first rule, and jmax is equated to the rule found using i as an index into text for finding the lastrule. Then, at decision block 340, a test is performed to determine if j is greater than jmax. If so, then i+1 is returned at terminal block 320. If not, then a test is performed at decision block 350 to determine if rule(j) matches from i up to start after counting characters. If so, then i is incremented and processing passes to decision block 310. If not, then, j is incremented and control is passed to decision block 340 for further processing.

The operation proceeds as follows. Suppose that a user types a key which causes n characters to be inserted at offset i. After inserting the characters at offset i, check through all of the rules that span i. Find the smallest offset s that corresponds to the start of the source of one of these spanning rules. (Indexing by first character of source does not help in this case, since a backward search is performed, and the current character may be any character in the source or succeeding context of one of these rules. To handle this, the transliteration stores a number maximumBackup, which is the length of the longest (source + succeeding context−1). This is the furthest point back that a spanning rule could start at. The transliteration then searches from i-maximumBackup forward to find the first rule that spans the desired index, which determines the index s.)

Figure 4:
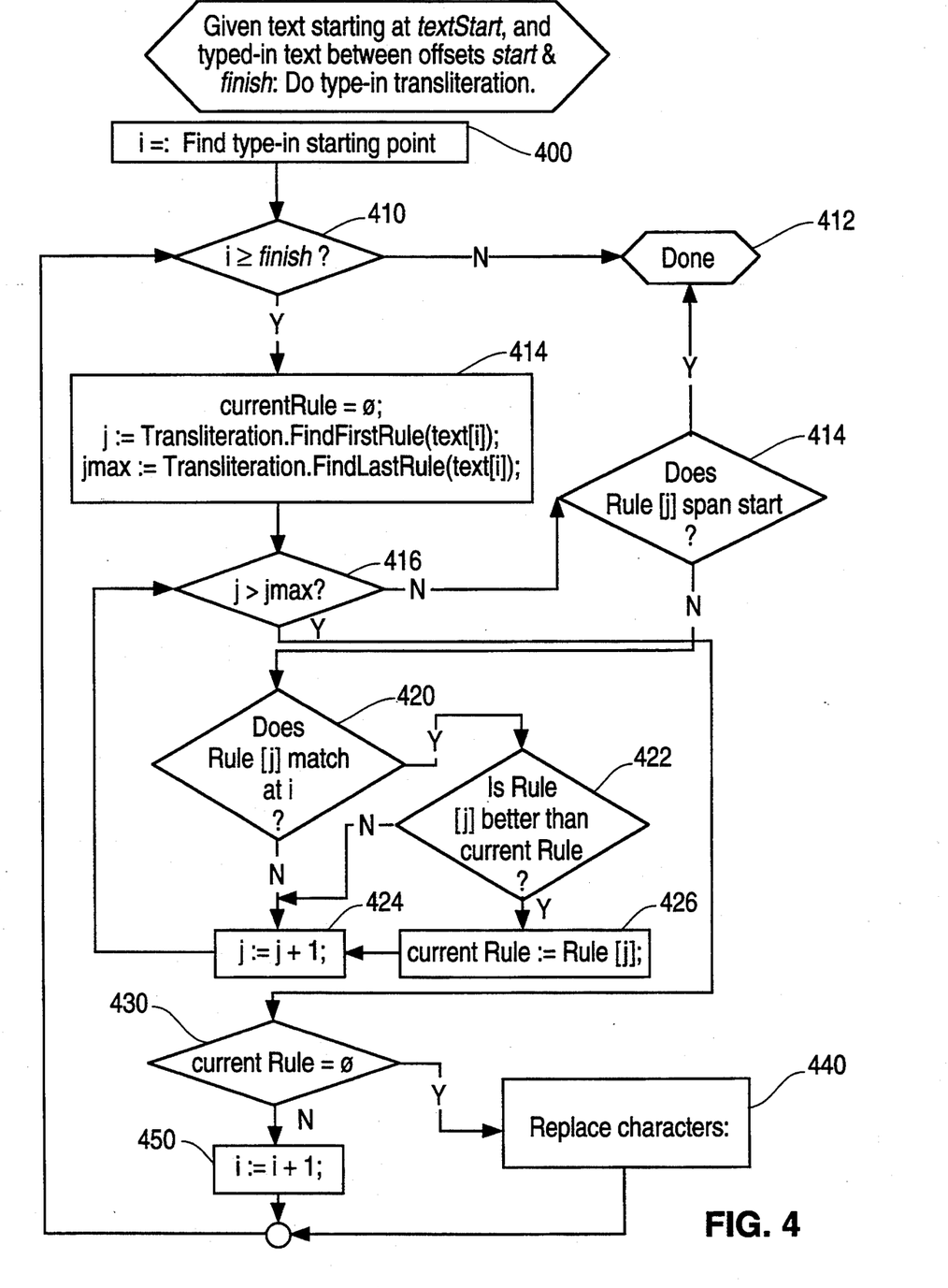
FIG. 4 is a flowchart of the logic used to provide type-in transliteration in accordance with a preferred embodiment.

FIG. 4 is a flowchart setting forth the detailed logic of type-in transliteration in accordance with a preferred embodiment of the invention. Processing commences at function block 400 where the type-in starting point is determined. Then, at decision block 410, a test is performed to determine if the index i is greater than or equal to finish. If not, then processing is completed at terminal 412. If so, then at function block 414, currentrule is equated to zero, the index j is equated to the first rule indexed by the index i, and jmax is set equal to the last rule indexed by the index i. Then, another test is performed at decision block 416 to determine if j is greater than jmax. If not, then a test is performed at decision block 414 to determine if Rule(j) spans start. If so, then processing is completed, and control is passed to terminal 412. If so, then another test is performed at decision block 430 to determine if currentrule is equal to zero. If so, then the index i is incremented and control is passed to decision block 410. If not, then at function block 440, characters are replaced in accordance with the current rule, and processing is passed to decision block 410.

Once the smallest offset is identified, all the rules that match must be identified at s up to i+n. If any of these rules also span i+n, then no conversions are performed. Otherwise, identify the best match within the transliteration ranges, and perform the substitution. Then, reset s according to the result and repeat this processing until done.

```
| a | b | c | d |░e░|░f░| g | h | i | j |
  0   1   2   3   4   5   6   7   8   9   10
```

In all the following examples, ef has been inserted at offset 4 in the above text.
Example: with the rules (cd⇒x; de⇒y), s=3; so convert the de to y, and do not convert the cd.
Example: with the rules (cdm⇒x; cd⇒y), s=2; so convert the cd to y, and do not affect the e.
Example: with the rules (abcdem ⇒x; ab ⇒ y; bc ⇒ z; bcm ⇒w; de⇒v), s=1; so convert the bc to z, and the de to v.

Human Interface

Figure 5:
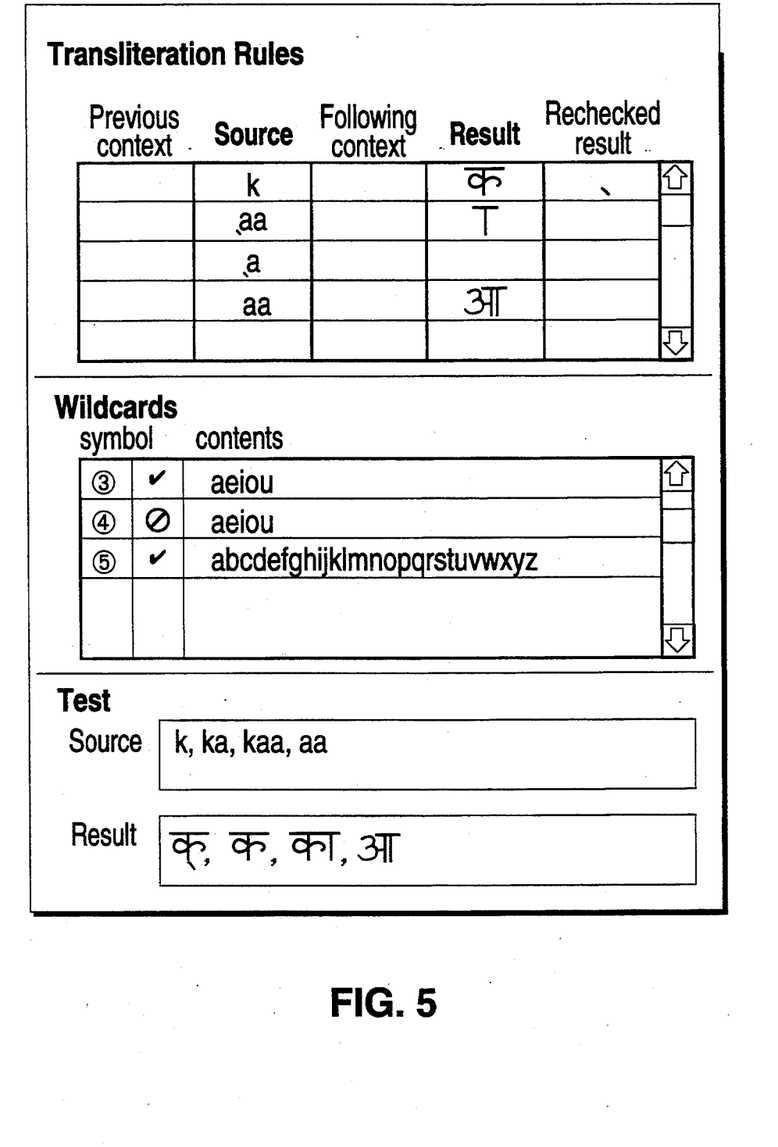
FIG. 5 is an illustration of a display in accordance with a preferred embodiment.

An example of the user interface display used to create transliteration rules is presented in FIG. 5. This Figure shows a transliteration display in the process of being created in accordance with a preferred embodiment of the invention. The rules are in the top box, with context variables in the center, and test samples at the bottom.

New rules can be added at the end, or inserted in the proper order. If rules do not conflict, or if any rule is inserted after a "better" rule, then it can be automatically reordered. For example, if the rule a ⇒ x exists, and the user adds the rule ab ⇒ y, then the inserted rule is reordered before the existing rule since otherwise it would have no effect. New context variables can be added at the end, because order is unimportant. The test source is transliterated into the result whenever any change is made, so that the user can check the correctness of the actions.

Figure 6:
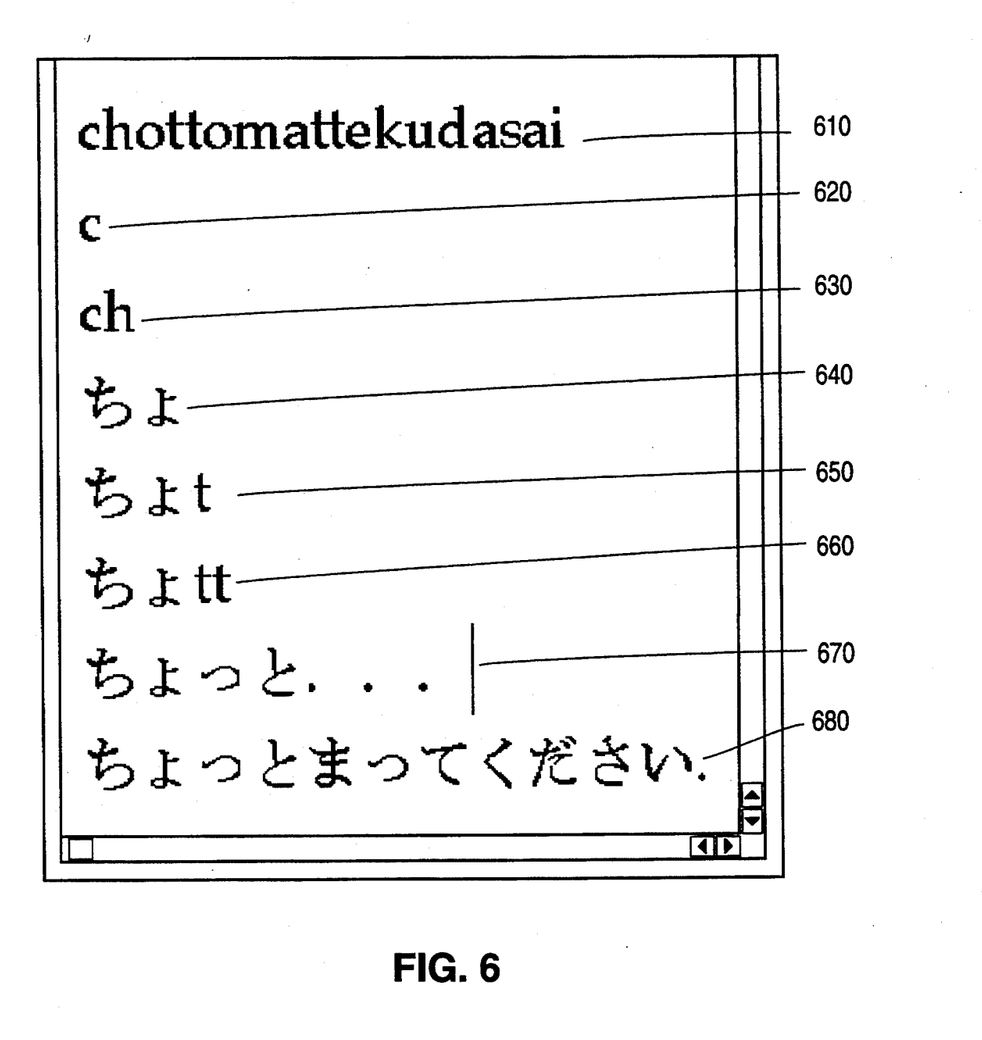
FIG. 6 is an illustration of a transliteration operation as it would appear on a user's display in accordance with a preferred embodiment of the invention.

FIG. 6 is an illustration of a transliteration operation as it would appear on a user's display in accordance with a preferred embodiment of the invention. At label 610, a sentence is typed in with transliteration disabled. Label 680 shows the sentence appearing at label 610 after it has been selected and fully transliterated. Labels 620 to 670 show what the user sees as she types in successive characters from label 610 with input transliteration enabled. At label 620, the user has entered the character "c". At label 630, the user has typed in "ch". At label 640, the user has typed "cho", and there is enough context to invoke the appropriate rule and transliterate the text input into "ちょ". A similar operation is performed on the additional examples appearing at labels 650 to 680.

TRANSLITERATOR CLASS AND METHOD DESCRIPTION

Class TTransliterator

TTransliterator is an abstract base class that transforms text based upon some well-defined rules or algorithm. It descends from TTextModifier, and can be used in conjunction with a word processing engine for inline transliteration during typing. Subclasses of TTransliterator can be used to perform intra-script transformation such as accent composition and upper or lower casing, or inter-script phonetic transcription. Inter-script transliteration provides an alternative way of entering non-Roman text. For example, instead of using a Hebrew keyboard, Hebrew text can be entered with an American keyboard using Roman to Hebrew transliteration. This class is also used to aid typing by providing smart quotes and other punctuation modifiers. TTransliterator provides methods for translating text as well as reversing the effect. These methods must be overridden by the concrete subclasses. TTransliterator is designed to enable chaining multiple objects together. One or more such objects can work within the editable text classes to allow for transliteration during typing.

The replacement text will also have the correct styles. E.g. if the source text is "aeieu", and the replacements are "Æ" for "a", "I" for "i", "O" for "o" and "U" for "u", then the replacement text will be: "ÆIOU". If a replacement for some characters is a larger number of characters, then the last style will be extended. For example, if the source is "Why", and the replacements are "VV for W", then the replacement text is: "VVhy". The "C" source code used to implement a preferred embodiment in accordance with the description above is set forth below.

```
Public Methods
/****************************************************
**
    TTextModifier overrides
****************************************************
*/
    virtual Boolean WantEvent (const TEvent& event) const=0;
        /* Override to always return FALSE.*/
    virtual Boolean ProcessEvent (const TEvent& event,
                    const TModeCommand& currentCommand)=0;
        /* Override to always return FALSE.*/
    virtual Boolean ProcessNewText (const TBaseText& newText,
                    const unsigned long numDeletes,
                    const TInsertionPoint& insertionPoint,
```

-continued

```
                TTexTTextRange& rangeToDelete,
                TBaseText& textToInsert)=0;
    /* Override to call Translate(). */
virtual void ProcessNewSelection (const TInsertionPont& insertionPoint,
                unsigned long length)=0;
    /* Override to do nothing. Transliterators don't care about new selection
*/
/***************************************************************
********
   These methods will directly translate(back the TBaseText argument.
   Subclass: This method calls the appropriate Translate() method and
        should not be overridden.
***************************************************************
*******/
        Boolean SimpleTranslate(TBaseText& text) const;
        Boolean SimpleTranslateBack(TBaseText& text) const;
/***************************************************************
********
Translate() takes a sourceText, and a range within that text, and either modifies the text
directly, or produces the replacement text and the range of characters to replace. In the latter
case, the replacement range is always a subset of the source range. It is up to the caller to call
the appropriate text methods to actually substitute the replacement. The actual
transformation is defined by a concrete subclass.
***************************************************************
*******/
virtual Boolean Translate (const TBaseText& sourceText,
                                                    const TTextRange&
sourceRange,
                                                    TBaseText&
replacementText,
                                                    TTexTTextRange&
replacemenTTextRange) const = 0;
virtual Boolean Translate (TBaseText& sourceText,
                                                    const TTextRange&
sourceRange,
                                                    TTextRange&
replacemenTTextRange,
                                                    unsigned long&
numNewChars) const = 0;
        /* This method is similar to the one above, the difference being that given a
        text object and a range within it, this method will directly change the
            text object. */
/***************************************************************
********
TranslateBack() takes the same arguments, but translates in the reverse direction, from
target characters back to source characters using a translation mechanism defined by a
concrete subclass. Note that these methods are not suitable for use with keyboard entry
***************************************************************
*******/
virtual Boolean TranslateBack (const TBaseText& sourceText,
                                                    const
TTextRange& sourceRange,
                                                    TBaseText&
replacementText,
                                                    TTextRange&
replacemenTTextRange) const = 0;
virtual Boolean TranslateBack (TBaseText& sourceText,
                                                    const
TTextRange& sourceRange,
                                                    TTextRange&
replacemenTTextRange,
                                                    unsigned
long& numNewChars) const = 0;
```

Class TRuleBasedTransliterator

TRuleBasedTransliterator is derived from TTransliterator. It uses a set of context-sensitive rules to transform text, and a parallel set to reverse this action. These rules are designed such that a knowledgeable non-programmer can edit them for localization. Roman rule-based transliteration is available for Japanese (kana), Hebrew, Arabic, Greek, Russian, and Devanagari.

TRuleBasedTransliterator also has the capability of specifying a range variable. These variables can then be used in the rules to provide some simple pattern-matching functions. An example of the foregoing is presented below.

```
Public Methods
/***************************************************************************
**
Constructor
***************************************************************************
*/
TRuleBasedTransliterator (const TFile& rulesFile);
```

-continued

```
    /* Instantiate a transliterator based on the rules in a file. */
/****************************************************************************
*******
    TTransliterator overrides. Translate() uses a set of context sensitive rules to perform the
    translation. See TTransliterateRule for more details. Rules are applied according to the
    principles of Partial and Multiple Replacements, as in the discussion above
    ****************************************************************************
    *******/
virtual Boolean Translate (const TBaseText& sourceText,
                                                const TTextRange&
sourceRange,
                                                TBaseText&
replacementText,
                                                TTexTTextRange&
replacementTTextRange) const;
virtual Boolean Translate (TBaseText& sourceText,
                                                const TTextRange&
sourceRange,
                                                TTextRange&
replacemenTTextRange,
                                                unsigned long&
numNewChars) const;
/****************************************************************************
********
TranslateBack() uses a set of context sensitive rules to performa the transliteration. takes
the same arguments, but translates in the reverse direction, from target characters back to
source characters. For example, with a Roman to Hebrew transliterator, Translate will go
from Roman to Hebrew; TransliterateBack will go from Hebrew to Roman
****************************************************************************
*******/
virtual Boolean TranslateBack (const TBaseText& sourceText,
                                                const
TTextRange& sourceRange,
                                                TBaseText&
replacementText,
                                                TTextRange&
replacemenTTextRange) const = 0;
virtual Boolean TranslateBack (TBaseText& sourceText,
                                                const
TTextRange& sourceRange,
                                                TTextRange&
replacemenTTextRange,
                                                unsigned
long& numNewChars) const = 0;
/****************************************************************************
********
Add and remove rules.
****************************************************************************
*******/
virtual void AddTranslationRule (const TTransliterateRule&    rule);
virtual void AddTranslationBackRule(const TTransliterateRule&  rule);
virtual void RemoveTranslationRule (const TTransliterateRule&  rule);
virtual void RemoveTranslationBackRule(const TTransliterateRule&    rule);
/****************************************************************************
********
Methods for range variables. These variables an be used for a limited degree of
"wildcarding". Any character that is not in the source or target set can be designated to be a
range variable. Effectively, that character will match against any of the characters in the
specified range. Inverse ranges can also be specified: in that case, a character matches
against any character not in the specified range.
For example, if $ is defined as a range variable equal to "ei", then the two rules:
    c[$>S
    c>K
will cause "c" in front of "i" or "e" to be converted to "S", and in front of anything else to be
converted to "K".
virtual void AddVariable (TransliterateVariable variableName,
                                                const TBaseText&
        variableValue,
                                                Boolean inverse =
FALSE);
virtual Boolean IsVariable (TransliterateVariable      ch) const;
        /* Checks to see if a particular unicode character represents a variable. */
/****************************************************************************
********
   Create iterators for the rules.
****************************************************************************
*******/
virtual TIterator* CreateIterator () const;
virtual TIterator* CreateTranslateBackIterator () const;
```

Class TTransliterateRule

TTransliterateRule implements a context sensitive transliteration rule. It is used within a TRuleBasedTransliterator.

Public Methods
```
/************************************************************************
    Construct a rule with four components. Note that these components cannot
    exceed 256 characters in length (This is an arbitrary limitation imposed by
    the desire to save as much space in rule storage as possible).
*************************************************************************
*******/
TTransliterateRule(const TBaseText&                keyText,
                        const TBaseText&
        resultText,
                        const TBaseText* const    preceedContext=NIL,
                       ·const TBaseText* const    succeedContext=NIL);
/************************************************************************
    Use the rule described by the current object ot perform translation. This
    method is called by TRuleBasedTransliterator::Translate()
*************************************************************************
*******/
virtual long Translate(TBaseText& sourceText, unsigned long&sourceOffset, unsigned
long&numReplacedChars, unsigned long&numNewChars) const;
/************************************************************************
    Determines if the rule defined by this object applies to a given text object
*************************************************************************
*******/
    virtual Boolean DoesRuleApply(const TBaseText&text, const unsigned long textOffset,
    const TDictionary&variableTable, Boolean&variableMatch, unsigned
    long&translatableChars) const;
```

Class TKorean Transliterator

TKoreanTransliterator implements Korean Jamo<->Hangul transliteration. It is a subclass of TTransliterator, however, the algorithm used is completely different than the rule-based transliteration implemented by TRuleBasedTransliterator. Background: Each Hangul character consists of two to three components, called Jamo's. The first and second components are mandatory; however, the third is optional. The transliterator assumes that all defined Jamo and Hangul characters can be in the source text, even though some complex Jamos cannot be entered from certain keyboards. This means that another preprocessors is needed to compose the complex Jamos from the "typeable" Jamo. The reason that this step is separated from Jamo-Hangul transliteration is that the Jamo-Jamo composition is highly dependent on the keyboard layout where the Jamo-Hangul process is not.

Class THexTransliterator

THexTransliterator is derived from TTransliterator. It transforms hex numbers between one and four digits to their unicode representations. When used inline, THexTransliterator provides a simple input method for generating Unicode characters that cannot be entered with a keyboard.

Class TSystem Transliterator

TSystemTransliterator is the user's interface to the system's transliterators. It can be used to get and set the current transliteration, and to query for the available transliterators on the system as well as perform all the public protocol of TTranslator. It is notified when a change occurs in the system transliterator.

```
Public Methods
(TTransliterator overrides)
/************************************************************************
**
    The following constants define the transliterators currently available
    in the system
*************************************************************************
*/
static const TToken& kRomanTransliterator;
static const TToken& kJapaneseTransliterator;
static const TToken& kKatakanaTransliterator;
static const TToken& kArabicTransliterator;
static const TToken& kCapitalizeTransliterator;
static const TToken& kHebrewTransliterator;
static const TToken& kDevanagariTransliterator;
static const TToken& kRussianTransliterator;
static const TToken& kSymbolTransliterator;
static const TToken& kGreekTransliterator;
/************************************************************************
*******
    Query for all available transliterators. Returns a TCollection of TTokens,
    each being the name of a transliterator.
*************************************************************************
*******/
```

-continued
```
virtual void AvailableTransliterators(TCollection&    transliterators) const;
/**************************************************************************
*******
   Gets and sets the system transliterator by name. If SetSystemTransliterator()
   is called, the next call to any public method in this class will reflect the change.
**************************************************************************
*******/
virtual void GetSystemTransliteratorName(TLocaleName& name) const;
virtual void SetSystemTransliterator(const TLocaleName& name);
```

EXAMPLES IN ACCORDANCE WITH A PREFERRED EMBODIMENT

Creating a TRuleBasedTransliterator from a Text File

The TRuleBasedTransliterator object can be created from a text file. The file contains an ordered sequence of definitions, range variables, forward rules and backward rules. The following example consists of fragments of a text file specification for Devanagari (Hindi). Comments are preceded with a hash mark (#). The following are character identifier definitions. ($XXXX indicates a Unicode character.) Once an identifier definition has been processed, then any occurrence of that identifier within brackets will be replaced by the right-hand side. In these text file examples, the x) preceding context, y) source, z) succeeding context, a) result, b) rechecked result are represented as: x] y [z>a|b as discussed in more detail below. For example:

ka=$915
    kha=$916
    ga=$917
    gha=$918
    nga=$919
    virama=$94D
    aa=$93E
    i=$93F
    ii=$940
    u=$941
    uu=$942
    rh=$943
    lh=$944
    e=$947
    ai=$948
    o=$94B
    au=$94C The following are range variables:
    &:{virama}{aa}{ai}{au}{ii}{i}{uu}
        {u}{rrh}{rh}{lh}{e}{o}
    δ:bcdfghijklmnpqrstvwxyz The following convert from Latin letters to Devanagari letters.
    kh>{kha}|{virama}
    k>{ka}|{virama}
    q>{ka}|{virama}
    {virama}aa>{aa}
    {virama}ai>{ai}
    {virama}au>{au}
    {virama}ii>{ii}
    {virama}i>{i}
    # otherwise convert independent forms when separated by ': k'ai →{ka}{virama}{wai}
    {virama}'aa>{waa}
    {virama}'ai>{wai}
    {virama}'au>{wau}
    {virama}'ii>{wii}
    # convert to independent forms at start of word or syllable: # e.g. keai→>{ka}{e}{wai}; k'ai →>{ka}{wai}; (ai)→>({wai})
    aa>{waa}
    ai>{wai}
    au>{wau}
    ii>{wii}
    i>{wi}

The following rules convert back from Devanagari letters to Latin letters. Note that a less-than sign is used for the backwards rules.
    # normal consonants
    {kha}[&<kh
    {kha}<kha
    {ka}{virama}[{ha}<k'
    {ka}[&<k
    {ka}<ka
    {gha}[&<gh
    {gha}<gha
    # dependent vowels (should never occur except following consonants)
    {aa}<aa
    {ai}<ai
    {au}<au
    {ii}<ii
    # independent vowels (when following consonants)
    δ{waa}<'aa
    δ{wai}<'ai
    δ{wau}<'au
    δ]{wii}<'ii Translating Text Using the System Transliterator

```
void TranslateText(TBaseText& text)
{
        // Instantiates a TSystemTransliterator. Will perform transliteration
        // based on the object currently chosen for the system. The default
        // is "Roman", which includes accent composition and smart quotes.
        TSystemTransltierator transliterator;
        TText replacementText;
        TTextRange replacemenTTextRange;
        if (transliterator.Translate(text, TTextRange(0, text.Length()),
    replacementText, replacemenTTextRange))
        {
                text.DeleteText(replacemenTTextRange.RangeBegin(),
                        replacemenTTextRange.RangeLength());
            text.InsertText(replacementText, text.Length());
        }
}
```

-continued

}

Creating and Using Pre-Defined Transliterator

```
void UpperCase(TBaseText& text)
{
    // Instantiates the "Capitalize" transliterator. Note that
    // creating a transliterator is very expensive since it has
    // to either build or stream in the table. Therefore it's
    // best to create once only.
    static TRuleBasedTransliterator upperCase(TSystemTransliterator::kCapitalize);
    TText replacementText;
    TTextRange replacemenTTextRange;
    if (upperCase.Translate(text, TTextRange(0, text.Length()),
        replacement(Text, replacemenTTextRange))
    {
            text.DeleteText(replacemenTTextRange.RangeBegin(),
            replacemenTTextRange.RangeLength());
            text.InsertText(replacementText, text.Length());}
    // to change text into lower case, call the TranslateBack()
    // method.
void ChangeSystemTransliterator(const TLocaleName& newTransliteratorName)
{
    // Instantiates a TSystemTransliterator.
    TSystemTransliterator transliterator;
    transliterator.SetCurrentTransliterator(newTransliteratorName);
}
```

While the invention has been described terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system for transliterating a first text string containing characters from a first language into a second text string containing characters from a second language as it is input to the computer, the system comprising;
    (a) a storage;
    (b) means for creating a plurality of transliterator objects, each of the plurality of transliterator objects having a plurality of transliteration rules arranged in the storage in a preferred order, each of the plurality of transliteration rules having a first language character string and a second language character string, the transliterator object further having an object method for comparing the first language character string in each of the transliteration rules to the first text string to determine a subset of transliteration rules which exhibit a match;
    (c) a display for displaying text as it is entered into a computer;
    (d) means responsive to the first text string for selecting one of the plurality of transliterator objects;
    (e) means responsive to the first language characters in the first text string for calling the object method in the selected transliterator object; and
    (f) means responsive to the preferred order for selecting one of the subset of transliteration rules to the first text string and displaying the second language character string of the selected transliteration rule on the display;
    wherein each of the plurality of transliterator objects comprises a method for displaying a transliterator icon representing the transliterator object on the display and the means for selecting one of the plurality of transliterator objects comprises means responsive to a selection of a displayed transliterator icon for selecting a corresponding transliterator object.

2. The system as recited in claim 1, wherein the means for initiating a text processing operation comprises means for selecting a transliterator object by double-clicking on the displayed transliterator icon.

3. The system as recited in claim 1, wherein the first text string is contained in a document represented by a document icon and the means for selecting the transliterator object comprises means for selecting a transliterator object by moving one of the transliterator icons and the document icon into a display area.

4. The system as recited in claim 1 wherein each first language character string includes:
    (a) at least one preceding context character designation;
    (b) at least one source character; and
    (c) at least one succeeding context character designation.

5. The system as recited in claim 4 wherein at least one of the first language character strings includes text for rechecking.

6. The system as recited in claim 4 wherein the first language character string comprises at least one variable character wherein the variable character comprises a list of characters and a designation of whether the associated transliteration rule is inclusive and exclusive of the characters in the list.

7. The system as recited in claim 4 wherein the creating means comprises hashing means for storing the plurality of transliteration rules in the storage based on a hashing algorithm.

8. The system as recited in claim 1 wherein the object method controls means for calculating an optimal number of characters to compare to the first language character string to determine a match.

9. The system as recited in claim 1 further comprising:

means responsive to a selection of one of the plurality of transliterator objects for displaying the plurality of transliterator rules in the selected transliterator object on the display;

means controlled by a user for composing a new transliteration rule and adding it to the transliterator object;

means controlled by a user for modifying one of the plurality of displayed transliteration rules;

and means for storing new and modified rules for use in the transliteration operation.

10. The system as recited in claim 1 further comprising an input device and means for receiving first language characters from the input device and wherein the means for calling the object method is responsive to each of the first language characters received from the input device.

11. The system as recited in claim 1 wherein at least one of the transliteration rules comprises the first language character string having multiple characters and the second language character string comprising a single character representation of the multiple characters, and wherein the single character representation is stored in the storage and displayed as the single character representation on the display.

12. The system as recited in claim 1 wherein each of the plurality of transliterator objects comprises a plurality of transliteration rules for converting first language character strings into second language character strings and a plurality of transliteration rules for converting second language character strings into first language character strings for transliterating forward and backward.

13. A method for transliterating a first text string containing characters from a first language into a second text string containing characters from a second language in a computer system having a storage and a display as it is input to a computer, the method comprising the steps of:

(a) creating a plurality of transliterator objects, each of the plurality of transliterator objects having a plurality of transliteration rules arranged in the storage in a preferred order for converting first language character strings into second language character strings and an object method for comparing the first language character string in each of the transliteration rules to the first text string to determine a subset of transliteration rules which exhibit a match;

(b) selecting one of the plurality of transliterator objects in response to the first text string as it is entered into the computer;

(c) calling the object method in the selected transliterator object in response to the first language characters in the first text string; and (d) selecting one of the subset of transliteration rules and applying the selected transliteration rule to the first text string and displaying the second language character string of the selected transliteration rule on the display;

wherein each of the plurality of transliterator objects comprises a method for displaying a transliterator icon representing the transliterator object on the display and step (b) comprises the step of selecting displayed transliterator icon.

14. The method as recited in claim 13 wherein step (b) further includes the step of selecting a transliterator object by double-clicking on the displayed transliterator icon.

15. The method as recited in claim 14 wherein the computer system further comprises an input device and means for receiving first language characters from the input device and wherein step (c) comprises the step of calling the object method in response to each of the first language characters received from the input device.

16. The method as recited in claim 13 wherein the first text string is contained in a document represented by a document icon and step (b) comprises the step of selecting a transliterator object by moving one of the transliterator icons and the document icon into a display area.

17. The method as recited in claim 16 wherein step (a) includes the step of forming a transliteration rule in which the first language character string comprises at least one variable character comprising a list of characters and a designation of whether the associated transliteration rule is inclusive and exclusive of the characters in the list.

18. The method as recited in claim 16 wherein step (a) includes the step of storing the plurality of transliteration rules in the storage based on a hashing algorithm.

19. The method as recited in claim 13 wherein step (a) comprises the steps of:

(a1) forming a transliteration rule with a first language character string including at least one preceding context character designation;

(a2) adding to the first language character string formed in step (a1) at least one source character; and (a3) adding to the first language character string formed in step (a2) at least one succeeding context character designation.

20. The method as recited in claim 19 wherein step (a) includes the step of forming a transliteration rule with a second language character string which includes text for rechecking.

21. The method as recited in claim 13 wherein step (c) comprises the step of calculating an optimal number of characters to compare to the first language character string to determine a match.

22. The method as recited in claim 13 further comprising the steps of:

(e) displaying the plurality of transliterator rules in the selected transliterator object on the display in response to a selection of one of the plurality of transliterator objects;

(f) composing a new transliteration rule and adding it to the transliterator object;

(g) modifying one of the plurality of displayed transliteration rules; and (h) storing new and modified rules for use in the transliteration operation.

23. The method as recited in claim 13 wherein step (a) comprises the steps of forming a transliteration rule having a first language character string with multiple characters and a second language character string comprising a single character representation of the multiple characters, storing the single character representation in the storage and displaying the single character representation on the display.

24. The method as recited in claim 13 wherein step (a) comprises the step of forming each of the plurality of transliteration objects with a plurality of transliteration rules for converting first language character strings into second language character strings and a plurality of transliteration rules for converting second language character strings into first language character strings to allow transliterating forward and backward.

* * * * *